United States Patent [19]

Kessler

[11] Patent Number: 5,053,622

[45] Date of Patent: Oct. 1, 1991

[54] EARLY BALLISTIC MISSILE DETECTION SYSTEM

[75] Inventor: Bernard V. Kessler, Greenbelt, Md.

[73] Assignee: The United States of America as represented by the Secretary of the Navy, Washington, D.C.

[21] Appl. No.: 398,296

[22] Filed: Sep. 13, 1973

[51] Int. Cl.[5] .......................... G01F 23/00; B64D 1/04
[52] U.S. Cl. .................................. 250/358.1; 89/1.11; 250/290; 250/369; 250/372; 250/484.1
[58] Field of Search ............... 250/358, 359, 369, 370, 250/372, 484, 290 C, 290 E; 343/18 E; 89/1.11; 342/9; 376/159

[56] References Cited

U.S. PATENT DOCUMENTS

| | | | |
|---|---|---|---|
| 3,327,124 | 6/1967 | Plum | 343/18 E |
| 3,422,264 | 1/1969 | Martina | |
| 3,573,221 | 3/1971 | Brunskill | 250/484 |
| 3,582,652 | 6/1971 | McCall | 250/484 |
| 3,754,145 | 8/1973 | Leaf | 250/484 |
| 3,769,510 | 10/1973 | Kotera et al. | 250/484 |
| 3,792,282 | 2/1974 | Braunlich | 250/484 |
| 3,832,545 | 8/1974 | Bartko | 250/359 |
| 4,320,298 | 3/1982 | Buford, Jr. et al. | 250/358 |

OTHER PUBLICATIONS

Denham et al., A $CaF_2$:DY Thermoluminescent Dosimeter for Environmental Monitoring, 8-1972, Batelle Labs.

Primary Examiner—Stephen C. Buczinski
Attorney, Agent, or Firm—Kenneth E. Walden

[57] ABSTRACT

This invention relates to an optical detection of ballistics device using satellites emitting beams of neutral molecules in a specified direction. Intense optical radiation will be reflected off insulated surfaces of nose cones and detected by narrow band optical filters on the satellite.

18 Claims, 1 Drawing Sheet

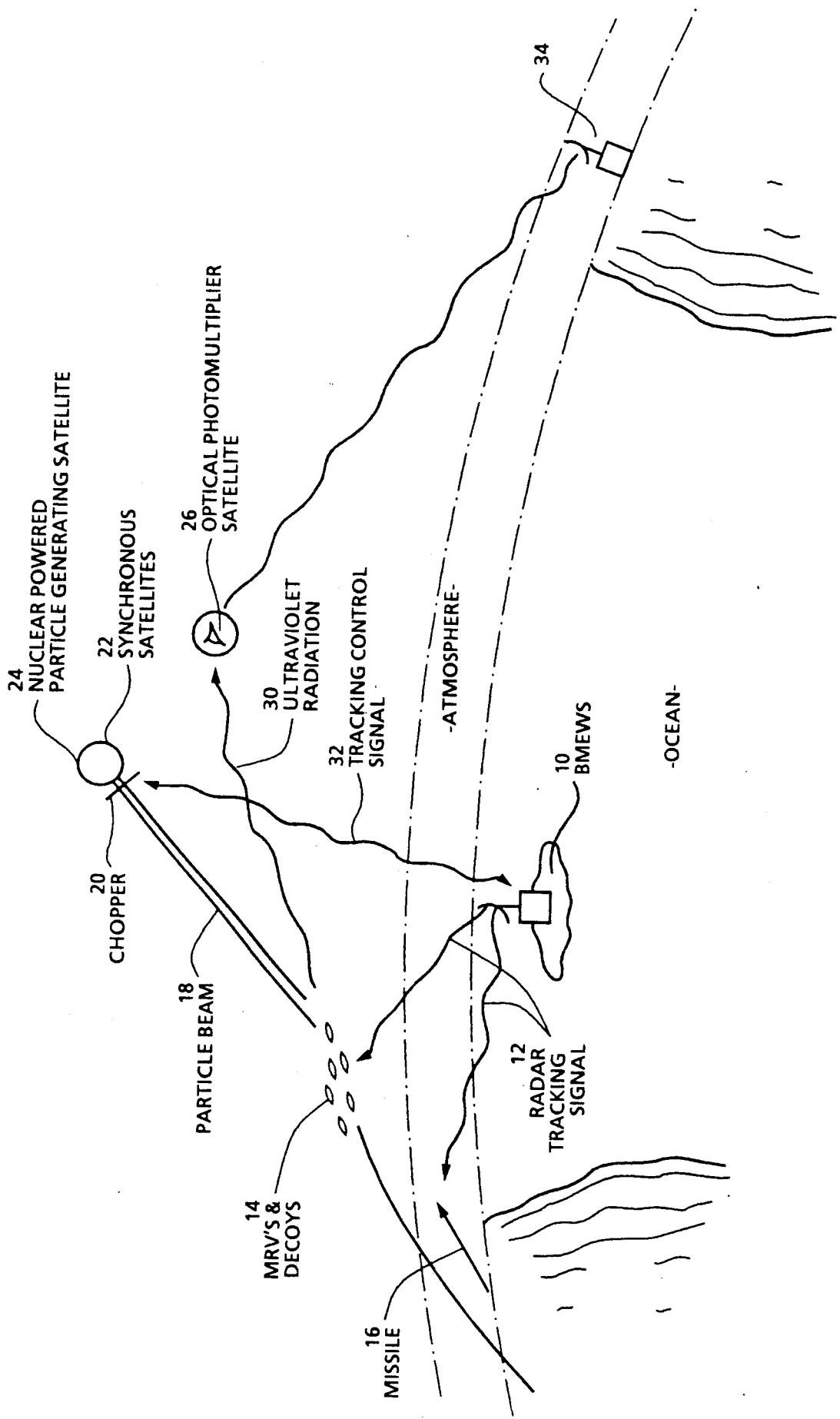

EARLY BALLISTIC MISSILE DETECTION SYSTEM

BACKGROUND OF THE INVENTION

The present invention relates generally to communications systems and more specifically to countermeasures used for differentiation of live nuclear warheads from dummy warheads released by intercontinental ballistic missiles. Existing anti-ballistic missile (ABM) systems can be easily nullified with inexpensive penetration aids. One common way of achieving these ends is to saturate the ABM tracking system with multiple warheads and decoys causing the defensive country to fire their antimissile missiles at both, being unable to distinguish one from another. Once the defensive country has fired all of their antimissile missiles they are helpless to any further attack. Since the relative cost of deploying decoys is much less than the missiles for destroying them, some method is needed to differentiate between decoys and nuclear warheads.

The only viable method presently available to distinguish warheads from decoys consisting of observing the behavior of the decoys and warheads as they reenter the atmosphere. Normally lighter decoys, such as fragments of the last stage of the ICBM, foil-covered balloons, etc., will fall at a much slower rate than a nuclear warhead once they reenter the atmosphere. By tracking these objects with radar, their reentry speed and trajectory can be easily determined thereby allowing the radar operator to pick out the read warheads from the decoys. This method fails however if the decoys are made of the same weight and shape to have the same trajectory and falling rate as the nuclear warheads. The primary disadvantage with this system however is that the trajectory of most ICBM's is such that their reentry point into the atmosphere is at a point which is normally close to its intended target. This, of course, leaves little time for analysis, identification, and retaliation thereby lessening the chances for a successful defense.

SUMMARY OF THE INVENTION

The present invention overcomes the limitations and disadvantages of the prior art by providing a device for distinguishing thermo-nuclear reentry vehicle from decoys by detecting the chemical make-up of the nuclear reentry vehicles and decoys soon after they leave the earth's atmosphere. This is achieved by a system having a deployed satellite which can emit a beam of neutral or charged particles (protons or ions) in a specified direction controlled by a ground station through a telemetry link. Intense optical radiation is emitted from insulated surfaces of nose cones of the nuclear warheads when impacted by the neutral or ion beam. Narrow band optical sensors are deployed on a second satellite to detect the optical characteristics of the emitted radiation and thereby the chemical make-up of the nose cones to distinguish the actual nuclear warheads from similar decoys.

It is therefore the object of the present invention to detect objects in space.

It is also the object of the present invention to distinguish objects in space.

Another object of the invention is to provide a device for distinguishing nuclear warheads from decoys.

Another object of the invention is to provide a device for distinguishing nuclear warheads from decoys soon after they leave the atmosphere.

Other objects, advantages and novel features of the invention will become apparent from the following detailed description of the invention when considered in conjunction with the accompanying drawing.

BRIEF DESCRIPTION OF THE DRAWING

The sole FIGURE is a diagram of the early ballistic missile detection system according to the present invention.

DETAILED DESCRIPTION OF THE PREFERRED EMBODIMENT

Referring to the drawing, there is disclosed therein a semi-active optical system of early ballistic missile detection. The system includes the ballistic missile early warning system (BMEWS) 10 presently deployed which detects and tracks enemy missiles 16 shortly after their launch with great accuracy. The BMEWS 10 give an accurate indication f the location and trajectory of hostile missiles 16 and their warheads and decoys 14 which is relayed to a synchronous nuclear powered particle generating satellite 24 which emits a beam 18 of neutral or charged particles (i.e., protons or ions) in the direction of the missiles 16 and warheads and decoys 14 after they have left the atmosphere. Upon impact of these ions or low energy neutral particles (50 ev to 4 kev) with the insulated surface of the nose cone of the nuclear warhead, intense characteristic optical radiation is emitted which is usually in the ultraviolet frequency range. This optical radiation is due to the excited states of atoms and molecules sputtered off the surface of the impacted material.

The radiation is detected by a second satellite or set of optical photomultiplier satellites 26 which are also deployed above the atmosphere to detect the ultraviolet radiation. The satellite or satellites are also equipped with a set of narrow band optical spectrometers for distinguishing the emitted radiation from background noise, e.g., sun clutter. Most importantly, these spectrometers distinguish the actual warheads from the decoys which have different optical characteristic radiation because of their differences in chemical composition. The position of the warheads and decoys is also known since the direction of the emitted beams 18 from the nuclear powered particle generating satellite 24 is controlled by the ground telemetry link to BMEWS station 10 which also tracks the object by radar.

The primary advantage of this system is that it allows early optical detection of ballistic devices in the face of radar jamming and before the device becomes self luminous during vehicle reentry. The induced luminosity, usually in the ultraviolet frequency range, is characteristic of nose cone material, making up the outer shell of the nuclear warhead reentry vehicle. This optical radiation is not subject to radar jamming countermeasures and could be used in conjunction with and supplementary to our present radar identification systems.

Obviously many modifications and variations of the present invention are possible in light of the above teachings. For example, to further distinguish the emitted optical radiation from background noise a chopper 20, e.g., slotted rotating disk, could be placed in front of the proton beam 18 to modulate the emission of optical radiation for easier detection. Also, if synchronous satellites were found to be unsuitable because of their required altitude, a series of low orbiting satellites could be used in their place both for the source and detector satellites. In addition, since only a particular area of sensitive airspace need be reconoitered, it could be covered with an umbrella of charged particles placed in orbit so as to be reuseable.

There are also many "peace time" uses for the present invention. For example, this system could be used to determine the chemical composition of nose cones used in test firing by foreign countries where this information is not available. This is useful in perfecting the present system to discriminate nose cones from decoys. Finally, the optical radiation can be used as a navigational system above the atmosphere to precisely locate objects in space as, for example, to correct offensive missiles or ABM missiles either in midcourse or termally where radar has been found to be useless.

It is therefore to be understood that within the scope of the appended claims the invention may be practiced otherwise than as specifically described.

I claim:

1. A system for detecting an object in space comprising: means for generating a beam of particles above the atmosphere, modulating means for chopping said beam, means for detecting optical radiation emitted from said object upon impact with said particles in the chopped beam, means for distinguishing said optical radiation emitted from said object from background radiation, and means for signaling the detection of said optical radiation emitted from said object.

2. The system of claim 1 wherein said means for generating particles comprises a nuclear powered particle generating synchronous satellite.

3. The system of claim 1 wherein said means for generating particles comprises as series of synchronous satellites.

4. The system of claim 1 wherein said means for detecting optical radiation comprises an optical photomultiplier satellite.

5. The system of claim 1 wherein said means for distinguishing comprises a narrow band optical wavelength spectrometer.

6. The system of claim 1 wherein said particles in the chopped beam are neutrals.

7. The system of claim 1 wherein said means for generating particles comprises a series of orbiting nuclear powered particle generating satellites.

8. The system of claim 1 wherein said means for generating particles above the atmosphere creates an umbrella of orbiting charged particles over a particular area of space.

9. A system for detecting an object in space comprising: means for generating particles above the atmosphere including a chopper for emitting a modulated beam of neutrals, means for detecting optical radiation emitted from said object upon impact with said neutrals, means for distinguishing said optical radiation from said object from background radiation and means for signaling the detection of said optical radiation emitted from said object.

10. A system for distinguishing two objects in space having outer coverings of different chemical composition, comprising: means for generating a beam of particles above the atmosphere; modulating means for chopping said beam; means for detecting optical radiation emitted from the outer covering of each of said objects upon impact with said particles in the chopped beam; means for differentiating spectral bands of said optical radiation emitted from each of said objects, and analyzing means transmitting data of said differentiated spectral bands on each of said objects for determination of the chemical composition of each of the outer coverings of said objects.

11. The system of claim 10 wherein said means for generating particles comprises a nuclear powered particle generating synchronous satellite.

12. The system of claim 10 wherein said means for generating particles comprises as series of synchronous satellites.

13. The system of claim 10 wherein said means for detecting optical radiation comprises an optical photomultiplier satellite.

14. The system of claim 10 wherein said means for differentiating comprises a narrow band optical wavelength spectrometer.

15. The system of claim 10 wherein said particles in the chopped beam are neutrals.

16. The system of claim 10 wherein said means for generating particles comprises a series of orbiting nuclear powered particle generating satellites.

17. The system of claim 10 wherein said means for generating particles above the atmosphere creates an umbrella of orbiting charged particles over a particular area of space.

18. A system for distinguishing two objects in space comprising: means for generating particles above the atmosphere including a chopper for emitting a modulated beam of neutrals; means for detecting optical radiation emitted from outer coverings of each of said objects upon impact with said neutrals; means for differentiating spectral bands of radiation from said optical radiation emitted from each of said objects, and means for transmitting data of said differentiated spectral bands of radiation for each of said objects for analysis to determine chemical composition of each of said objects.

* * * * *